(12) United States Patent
Murthy

(10) Patent No.: US 8,439,448 B2
(45) Date of Patent: May 14, 2013

(54) BUCKLE FOR CENTER OCCUPANT FOR BENCH SEAT WITH EXTENDED TRAVEL

(75) Inventor: Vasudeva Sankarshana Murthy, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 201 days.

(21) Appl. No.: 12/858,198

(22) Filed: Aug. 17, 2010

(65) Prior Publication Data

US 2012/0043792 A1  Feb. 23, 2012

(51) Int. Cl.
*B60N 2/06* (2006.01)

(52) U.S. Cl.
USPC ............................. 297/481; 297/468; 297/473

(58) Field of Classification Search .................. 297/233, 297/248, 344.11, 481; 280/801.2; 296/68.1, 296/65.13, 65.14, 65.15
See application file for complete search history.

(56) References Cited

U.S. PATENT DOCUMENTS

| | | | |
|---|---|---|---|
| 3,722,909 A | | 3/1973 | Esner |
| 4,239,260 A | * | 12/1980 | Hollowell ..................... 280/806 |
| 5,236,220 A | * | 8/1993 | Mills ........................ 280/801.1 |
| 5,303,983 A | | 4/1994 | Gauger et al. |
| 5,322,348 A | | 6/1994 | Johnson |
| 5,332,261 A | * | 7/1994 | Siepierski ................... 280/801.1 |
| 5,507,552 A | | 4/1996 | Ineich et al. |
| 5,536,066 A | | 7/1996 | Sedlack |
| 6,588,850 B2 | | 7/2003 | Matsuo |
| 7,178,876 B2 | * | 2/2007 | Borgward et al. ............ 297/481 |
| 2002/0047296 A1 | | 4/2002 | Houston et al. |
| 2009/0184559 A1 | * | 7/2009 | Nakaya et al. ........... 297/411.32 |
| 2010/0032976 A1 | * | 2/2010 | Yamashita et al. ........... 296/24.3 |

FOREIGN PATENT DOCUMENTS

JP    07223506    *  8/1995

* cited by examiner

*Primary Examiner* — David Dunn
*Assistant Examiner* — Timothy J Brindley
(74) *Attorney, Agent, or Firm* — Gifford, Krass, Sprinkle, Anderson & Citkowski, P.C.

(57) ABSTRACT

A 60/40 bench seat is provided allowing for increased sliding travel along a set of tracks to allow for easier ingress and egress of a vehicle passenger accessing the rear of a bench seat. The 60/40 bench seat assembly allows for increased travel along the tracks without adding significant increases in assembly parts, cost, or weight. The 60/40 bench seat assembly is provided including a profile member and a buckle. The 60/40 bench seat assembly is divided into a 40% section seat and a 60% section seat. The 60/40 seat assembly further includes a profile member operable to push down the buckle to allow for increased travel of the 60% seat. The buckle includes a first surface and the profile includes a second surface contacting the buckle first surface thereby pushing the buckle towards a vehicle floor.

14 Claims, 2 Drawing Sheets

BUCKLE FOR CENTER OCCUPANT FOR BENCH SEAT WITH EXTENDED TRAVEL

FIELD OF THE INVENTION

This invention relates generally to automotive vehicle seats. In particular, this invention relates to automotive vehicle seats allowing for increased sliding and movement.

BACKGROUND OF THE INVENTION

It is typical for a sport utility vehicle or minivan to have second and third row bench seats wherein the bench seat is divided into two sections. The two sections of the bench seat are independently movable along their respective tracks. It is common for the split bench seat to be divided into a 60% section and a 40% section (60/40 bench seat). It is highly desirable for 60/40 bench seats to have extended travel on both sides of the vehicle to allow a passenger to access third row seats or cargo behind the second row seats. However, travel on the 60% side is usually limited due to the center occupant vehicle safety restraint. Added structure is needed to mount the buckle to the moving seat frame to allow for increased travel of the 60% portion of the bench seat. Added structure increases the cost and weight of the overall seat assembly. Alternatively, added webbing as part of the buckle or safety restraint system may be added to allow for extended travel of the split bench seat. However, added webbing of the safety restraint could compromise the belt fit. Accordingly, it is highly desirable to have an automotive vehicle split bench seat assembly providing for proper fit for a center occupant while simultaneously decreasing cost and weight of the overall seat assembly.

SUMMARY OF THE INVENTION

A 60/40 bench seat is provided allowing for increased sliding travel along a set of tracks to allow for easier ingress and egress of a vehicle passenger accessing the rear of a bench seat. The 60/40 bench seat assembly allows for increased travel along the tracks without adding significant increases in assembly parts, cost, or weight. The 60/40 bench seat assembly is provided including a profile member and a buckle. The 60/40 bench seat assembly is divided into a 40% section seat and a 60% section seat.

The 60/40 seat assembly further includes a profile member operable to push down the buckle to allow for increased travel of the 60% seat. The buckle includes a first surface and the profile includes a second surface contacting the buckle first surface thereby pushing the buckle towards a vehicle floor. The buckle is connected to a support member connected to the track of the 40% seat. The support member and the buckle are connected to a track by means of a biasing member, typically a clock spring, allowing for the support member and the buckle to return to an upright position after the second surface and the first surface of the buckle are no longer in contact.

DETAILED DESCRIPTION OF THE INVENTION

Figure 1:
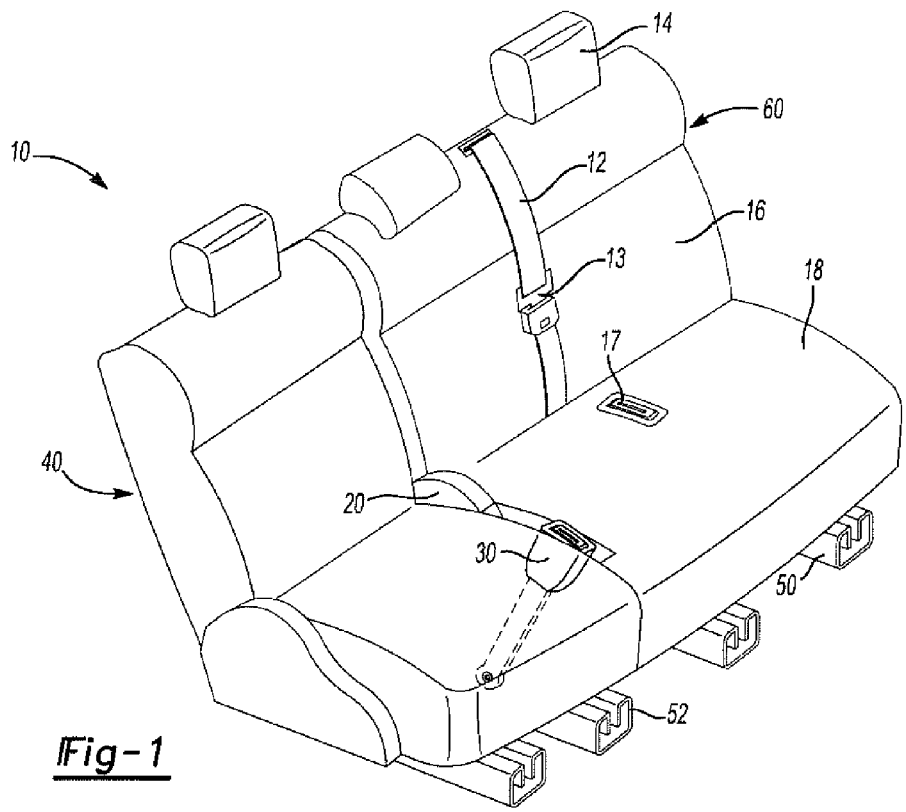
FIG. 1 is a perspective view of a fully assembled 60/40 split seat assembly.
Figure 2:
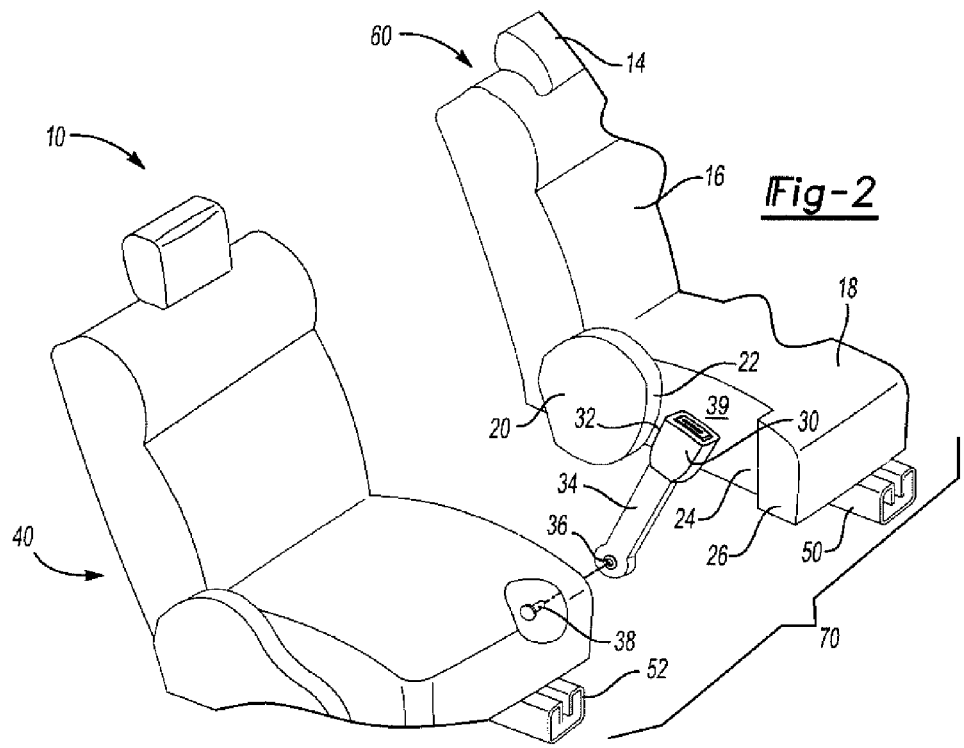
FIG. 2 is an exploded perspective view of the 60/40 split seat assembly.

A 60/40 bench seat 10 is provided allowing for increased sliding travel along a set of tracks 50, 52 to allow for easier ingress and egress of a vehicle passenger accessing the rear of the 60/40 bench seat 10. The 60/40 bench seat assembly 10 allows for increased travel along the tracks 50, 52 without adding significant increases in assembly parts, cost, or weight.

The 60/40 bench seat assembly 10 is provided including a profile member 20 and a buckle 30. The 60/40 bench seat assembly 10 is divided into a 40% section seat 40 and a 60% section seat 60. The 40% section seat 40 is slidable along the tracks 52. The 60% section seat 60 is slidable along the tracks 50. The 60/40 seat assembly 10 further includes a headrest 14, a seat back 16, and seating area 18. The profile member 20, in the present embodiment, is mounted to and extends away from a side surface 39.

The 60/40 seat assembly 10 further provides for a vehicle occupant restraint 12. The vehicle occupant restraint 12 is operable to keep safe a center vehicle occupant of the 60/40 bench seat assembly 10. The restraint 12 further includes the male buckle 13 operable to fit within the buckle 30.

The tracks 50, 52 allow the 40% seat 40 and the 60% seat 60 to independently and slidably move in a forward and rearward direction within the automotive vehicle. Movement of the 40% seat 40 and the 60% seat 60 is highly desirable to allow for ingress and egress of vehicle passengers to access the area behind the automotive vehicle 60/40 seat assembly 10. Furthermore, it is highly desirable to move the 40% seat 40 and 60% seat 60 to allow for users of the vehicle to access cargo or other items behind the 60/40 seat assembly 10.

The 60/40 seat assembly 10 further includes a profile member 20. The profile member 20 is operable to push down the buckle 30 to allow for increased travel of the 60% seat 60. The profile 20 is made of a plastic, polymer, polymer like, or metal material having highly resilient qualities. The buckle 30 includes a first surface 32. The profile 20 includes a second surface 22. Upon forward sliding of the 60% seat 60, the profile second surface 22 contacts the buckle first surface 32 thereby pushing the buckle 30 towards a vehicle floor 70. Once the buckle 30 is pushed to the floor 70, the seat 60 is able to slide to a forward position over the buckle 30 and the support member 34.

Without the ability for increased travel, the seat 60 is operable to travel along the tracks 50, 52 a distance between 100-150 centimeters. With the implementation of the profile 20, the spring-loaded support member 34 and the buckle 30, the seat 60 is capable of traveling a total distance of between 250-350 centimeters. The implementation of the profile member 20, the support member 34 and the buckle 30 add an extra travel distance between 150 and 250 centimeters depending on the configurations and set-up of the automotive vehicle.

The buckle 30 is connected to a support member 34. The support member 34 is connected to the track 52 of the 40% seat 40. The support member 34 and the buckle 30 are connected to the track 52 by means of a biasing member 38. The biasing member 38 allows for the support member 34 and the buckle 30 to return to an upright position after the second surface 22 and the first surface 32 of the buckle 30 are no longer in contact. The biasing member 38 may be a spring 60 to allow for the upright return of the buckle 30 and the support member 34.

Figure 3:
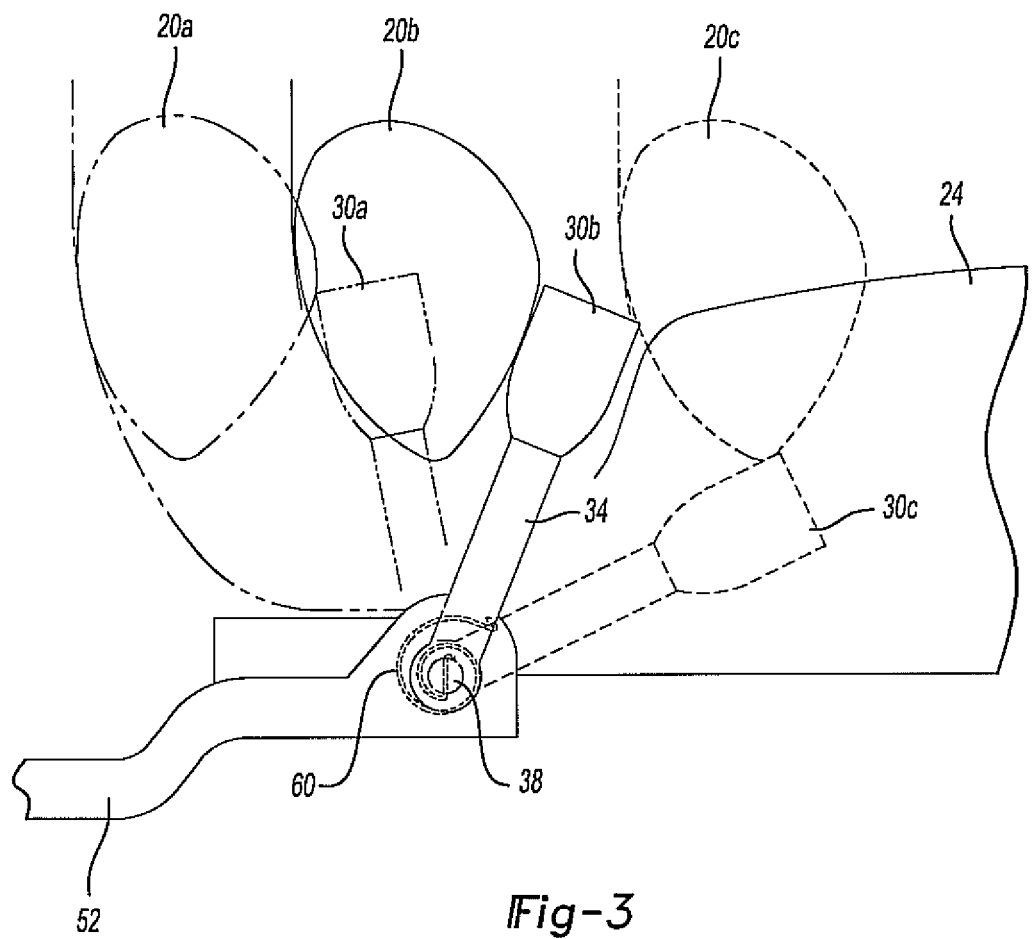
FIG. 3 is a side view depicting the movement of a sliding seat profile member contacting a buckle.

FIG. 3 shows the movement of the profile member 20 contacting the buckle 30. The progression of the profile member 20 and the buckle 30 is shown in three distinct positions A, B and C. At position A, the profile member 20A is shown just starting to contact the buckle 30A. Position A depicts travel of the 60% seat 60 just as it starts to slide forward. Position B shows profile member 20B in full contact with the buckle 30B wherein the 60% section seat 60 is progressively moving forward. Position C shows a position wherein the 60% seat 60 is fully moved to a most forward position along the track 50. The profile member 20C has pushed the buckle 30C down to a position close to the vehicle floor 70.

When the 60% seat 60 is moved rearward toward the operating position, the buckle 30 and support member 34 are retracted up to an operating position by means of the spring 60. In alternative embodiments, other biasing members are used to retract the support member 34 and the buckle 30 to the resting position.

Alternatively, the vehicle seat assembly 20 is divided according to different requirements such as a $^{50}/_{50}$ split, a $^{40}/_{60}$ split, or other split configuration. Furthermore, as the need for increased travel of either vehicle seat is needed, the elements of this invention may be switched and should only be limited by the appended claims. By way of example, the buckle 30 and support member 34 may be attached to the track 50 of the 60% seat 60 and the profile member 20 may be attached to the 40% vehicle seat 40 allowing for increased travel of the 40% seat 40.

In the present embodiment, the vehicle seat assembly 20 is divided into a 60/40 split, as described above. In all embodiments, herein the first seat 40 and the second seat 60 form a full bench seat. Furthermore, in the present embodiment, the size of the first seat 40 is 30-50% of the full bench seat. Also in the present embodiment, the size of the second seat 60 is 50-70% of the full bench seat. In an alternative embodiment, the size of the first seat 40 is 50-70% of the full bench seat. Also in the present embodiment, the size of the second seat 60 is 30-50% of the full bench seat.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

I claim:

1. A sliding automotive vehicle seat assembly within a vehicle operable to slide forwards and backwards allowing for ingress and egress of a passenger, the seat assembly comprising:
   a first seat disposed adjacent a second seat, the first seat and the second seat adapted to move independently from one another;
   a first track and a second track, the first seat slidably mounted on the first track operable to slide the first seat between a rear position and a forward position to move a first predetermined distance, the second seat slidably mounted on the second track operable to slide the second seat between a second rear position and a second forward position to move a second predetermined distance;
   a buckle pivotally mounted to a first pivot point, the first pivot point on the first seat, a shaft extending between the buckle and the first pivot point, the buckle having an outer surface; and
   a profile member mounted to the second seat operable to contact the outer surface of the buckle and push the buckle to move the buckle and the shaft downwards during movement of the second seat to a forward position.

2. The seat assembly of claim 1, wherein the profile member includes a shield located on the side of the profile member.

3. The seat assembly of claim 1, wherein the buckle is spring loaded.

4. The seat assembly of claim 1, wherein the buckle is affixed to a floor of the vehicle.

5. The seat assembly of claim 1, wherein the buckle is affixed to the first seat.

6. The seat assembly of claim 1, wherein the first seat and the second seat form a full bench seat.

7. The seat assembly of claim 6, wherein the size of the first seat is 30-50% of the full bench seat.

8. The seat assembly of claim 7, wherein the size of the second seat is 50-70% of the full bench seat.

9. The seat assembly of claim 6, wherein the size of the first seat is 50-70% of the full bench seat.

10. The seat assembly of claim 9, wherein the size of the second seat is 30-50% of the full bench seat.

11. The seat assembly of claim 1, wherein the first predetermined distance ranges between 80-150 centimeters.

12. The seat assembly of claim 1, wherein the second predetermined distance ranges between 80-150 centimeters.

13. The seat assembly of claim 1, wherein the extra travel predetermined distance ranges between 120-250 centimeters.

14. A sliding automotive vehicle seat assembly within a vehicle operable to slide forwards and backwards allowing for ingress and egress of a passenger, the seat assembly comprising:
   a first seat disposed adjacent a second seat, the first seat and the second seat adapted to move independently from one another, the second seat having a side surface;
   a first track and a second track, the first seat slidably mounted on the first track operable to slide the first seat between a rear position and a forward position, the second seat slidably mounted on the second track operable to slide the second seat between a second rear position and a second forward position;
   a buckle pivotally mounted to a first pivot point, the first pivot point on the first seat, a shaft extending between the buckle and the first pivot point, the buckle having an outer surface; and
   a profile member extending outwardly from the side surface of the second seat, the profile member operable to contact and push the outer surface of the buckle to move the buckle and the shaft downwards during movement of the second seat to a forward position.

* * * * *